(No Model.)
J. J. STOPPLE.
GRINDSTONE FIXTURE.
No. 398,753. Patented Feb. 26, 1889.
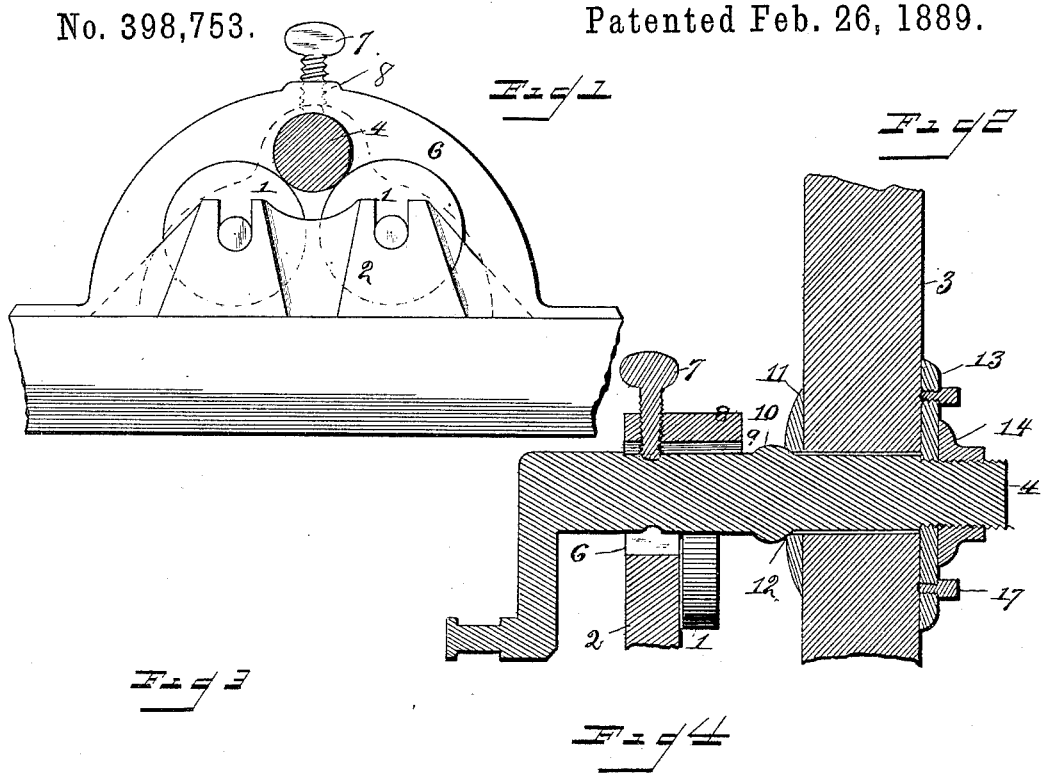
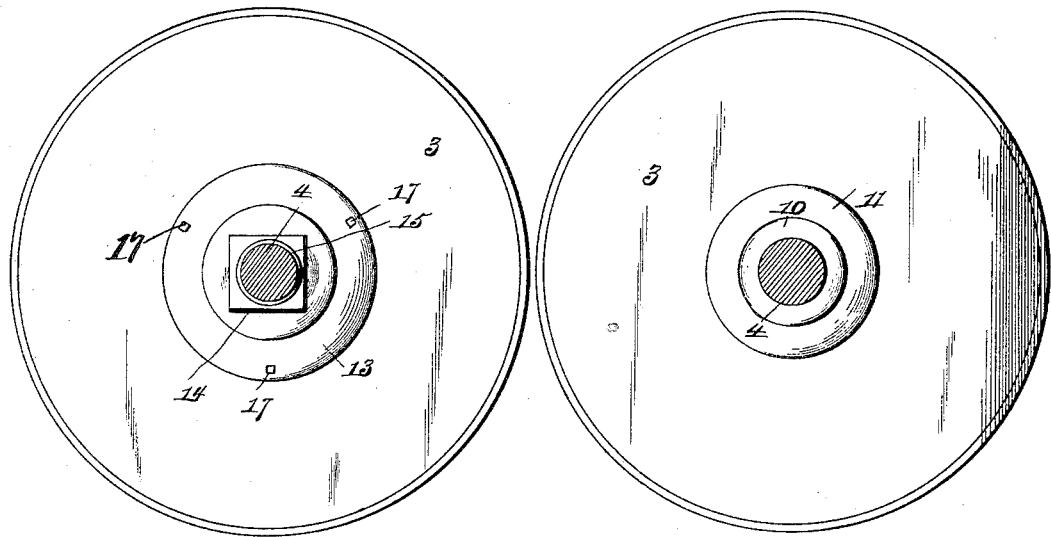
WITNESSES,
F. L. Ourand
Geo. E. Frech
INVENTOR.
John J. Stopple,
by Louis Bagger & Co.
Attorneys

UNITED STATES PATENT OFFICE.

JOHN JULIUS STOPPLE, OF BELLEVILLE, TEXAS.

GRINDSTONE-FIXTURE.

SPECIFICATION forming part of Letters Patent No. 398,753, dated February 26, 1889.

Application filed March 16, 1888. Serial No. 267,365. (No model.)

*To all whom it may concern:*

Be it known that I, JOHN JULIUS STOPPLE, a citizen of the United States, and a resident of Belleville, in the county of Austin and State of Texas, have invented certain new and useful Improvements in Grindstone-Fixtures; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of the bearing for a grindstone and of the stone. Fig. 2 is an axial vertical sectional view of the same. Fig. 3 is a side view of the stone from one side, and Fig. 4 is a similar view of the other side of the stone.

The same numerals of reference indicate the same or corresponding parts in all the figures.

My invention has relation to that class of anti-friction bearings for grindstones in which the shaft is journaled in bearings formed by two rollers having the shaft resting upon their peripheries; and it consists in the improved construction and combination of parts of such a bearing for a grindstone and in a fastening for securing the stone to the shaft, as hereinafter more fully described and claimed.

In the accompanying drawings the numeral 1 indicates the anti-friction rollers, which are journaled in the usual manner upon the side pieces, 2, of the support for the grindstone 3, and the shaft 4 of this stone rests upon the peripheries of these rollers, and has the arched or curved guards 6 straddling it at both sides of the stone in the usual manner. Set-screws 7 pass through suitable screw-threaded perforations, 8, in these guards, and project with their lower ends into peripheral grooves 9 in the shaft, preventing any lateral play of the shaft and stone in the roller-bearings. The shaft is formed near one face of the stone with a rounded collar, 10, and a washer, 11, bears with its concaved central aperture, 12, against this collar and bears with its flat inner side against the face of the stone. A washer, 13, bears against the other side of the stone, fitting upon the shaft, and this washer is forced against the stone by means of a nut, 14, fitting and turning upon a screw-threaded portion, 15, of the shaft. Small set-screws 17 project through suitable perforations in the washer and bear with their ends against the face of the stone, and it will be seen that the stone may be secured perfectly true upon the shaft by clamping it between the washers and thereupon setting it perfectly true with relation to the shaft by the set-screws, the rounded collar and the concave aperture of the washer admitting of the stone being adjusted into a plane at right angles to the shaft. By employing these washers and this style of fastening the stone may be fitted and adjusted upon the shaft without the necessity of cutting and fitting wedges or washers for securing it upon the shaft, as the washers will clamp the stone firmly without any further fastenings.

Having thus described my invention, I claim and desire to secure by Letters Patent of the United States—

In a fastening for grindstones, the combination of the shaft having the rounded collar and the screw-threaded portion, the stone fitting with its central perforation upon the shaft, the washer having the concave aperture fitting upon the collar, the washer having the set-screws, and the nut upon the threaded part of the shaft clamping the washers upon the stone, as shown, and for the purpose specified.

In testimony that I claim the foregoing as my own I have hereunto affixed my signature in presence of two witnesses.

JOHN JULIUS STOPPLE.

Witnesses:
J. K. STONE,
PETER HURING.